Jan. 10, 1967  G. E. ANDREWS ETAL  3,297,293
FASTENING DEVICE
Filed Jan. 13, 1965

INVENTORS
GARY E. ANDREWS
JOHN A. PALMER
BY Cohn and Powell
ATTORNEYS 3,297,293
FASTENING DEVICE
Gary E. Andrews, Florissant, Mo., and John A. Palmer, Columbus, Kans., assignors, by direct and mesne assignments, to American Drill Bushing Company, Los Angeles, Calif., a corporation of Maryland
Filed Jan. 13, 1965, Ser. No. 425,259
11 Claims. (Cl. 248—361)

This invention relates generally to improvements in a fastening device, and more particularly to a self-contained tie-down unit capable of transferring variable loadings into a base in a predictable area of loading with a calculated factor of safety.

An important object is achieved by a fastening device adapted for anchoring a load to a base in which a bushing is mounted to a stud attached to the base, the bushing having a bearing surface engageable with the base, and in which a load-attaching means is operatively connected to the bushing and stud for transferring load to the base through the bearing surface.

Another important object is attained by locating the bearing surface a predetermined distance from the axis of the bushing so that the unit can be designed and constructed for loads and conditions with a definite safety factor.

Still another important objective is afforded by the structural arrangement that forms the bearing surface, the bushing being recessed to provide an annular surface of concentrated area a designated distance from the centerline passing through the bushing.

An important object is provided by rotatively mounting a load ring on the bushing, and by connecting the ring to the bushing and stud so that a moment induced by an eccentric application of the horizontal component of load on the bushing in relation to the base is transformed into a couple acting in tension on the stud and in bearing between the base and the annular bearing surface of the bushing.

Another important object is realized by the provision of means operatively interconnecting the stud to the load ring and bushing so as to transmit the vertical component of load from the ring and bushing to the stud.

Yet another important object is achieved by rotatively mounting the load ring on the bushing for a full 360 degree swivel about the axis of the bushing, and by pivotally connecting an eye member to the ring on an axis transverse to the bushing axis for a swinging movement through substantially 180 degrees, in order to translate loads through any angle of loading into the base with all of the functional advantages mentioned previously.

An important object is attained by the unique structure of the bushing that makes it a valuable article of manufacture.

Another important object is to provide a double acting swivel eye that is simple and durable in construction, economical to manufacture and assemble, highly efficient in operation, and which can be installed and utilized by anyone with little or no instruction.

The foregoing and numerous other objects and advantages of the invention will more clearly appear from the following detailed description of a preferred embodiment, particularly when considered in connection with the accompanying drawing, in which.

Figure 1:
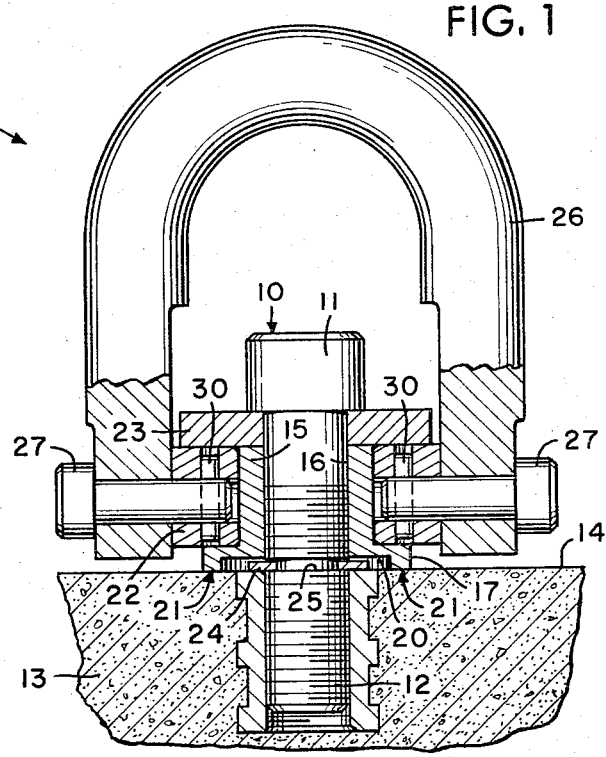
FIG. 1 is a side elevational view, partially in cross section along a vertical plane passed through the stud axis.

Referring now by characters of reference to the drawing, and first to FIG. 1 it is seen that the fastening device includes a stud referred to at 10 having an enlarged head 11 and a threaded shank 12. The stud 10 is attached in any suitable manner to a base 13. In the embodiment disclosed, the fastening device is secured to base 13 constructed of concrete. The base 13 includes an outer surface 14 that is not of a particularly smooth finish, but on the contrary, may possess a relatively rough or uneven finish.

Mounted on the stud shank 12 is a bushing 15, the bushing 15 having an axial bore 16 receiving the shank 12. The bushing 15 includes a peripheral, annular flange 17 at one end. The same bushing end is provided with a recess 20 extending from the bore 16 laterally outward into the flange 17 to provide an annular peripheral bearing surface indicated by arrows 21 engaging the base surface 14. This construction provides the bearing surface 21 of concentrated area at a predetermined distance from the axis of the bushing 15. Consequently, the bushing 15 will not engage the base surface 14 at any point except at the definitely defined and located bearing surface 21. Therefore, the device can be designed and constructed with a calculated safety factor.

If the end surface of bushing 15 were completely flat without the recess 20 defining the specific annular bearing surface 21, such bushing end could bottom on the base surface 14 at any point outwardly from the bushing bore 16 depending upon the roughness of the base surface 14 among other conditions. Under these circumstances, the region of bearing contact between the bushing 15 and the base 13 could not be accurately predetermined and therefor the device could not be designed with a calculated safety factor under variable loads.

A load ring 22 of a hexagon peripheral configuration is rotatively mounted on the bushing 15, the ring 22 frictionally engaging and seating on the top surface of bushing flange 17. It will be importantly noted that the load ring 22 can be freely rotated in either direction for a full 360 degrees about the bushing axis.

A circular plate 23 is fitted over the stud shank 12 and is located between the stud head 11 on one side and the bushing 15 and ring 22 on the other side. As will later appear, the plate 23 retains the bushing 15 and ring 22 on stud 10, and acts to transmit the vertical component of load from the bushing 15 and ring 22 to the stud 10.

A retaining ring 24 is snapped into annular groove 25 in the stud shank 12, the retaining ring 24 being located within the bushing recess 20 and engaging the bushing 15, whereby to hold the bushing 15 and ring 22 in assembly.

An eye member 26 of substantially U-shape has its ends pivotally connected to opposite sides of the load ring 22 by a pair of pivot pins 27. Each of the pivot pins 27 is attached to ring 22 by a lock pin 30 fitted into a vertical bore formed through the ring 22 and extending through a compatible and aligned hole formed in the end of the pin 27. The ends of the vertical bore containing the lock pin 30 are closed by the bushing flange 17 and the plate 23 so as to hold the lock pin 30 in place and preclude unintentional loss or disengagement.

Figure 2:
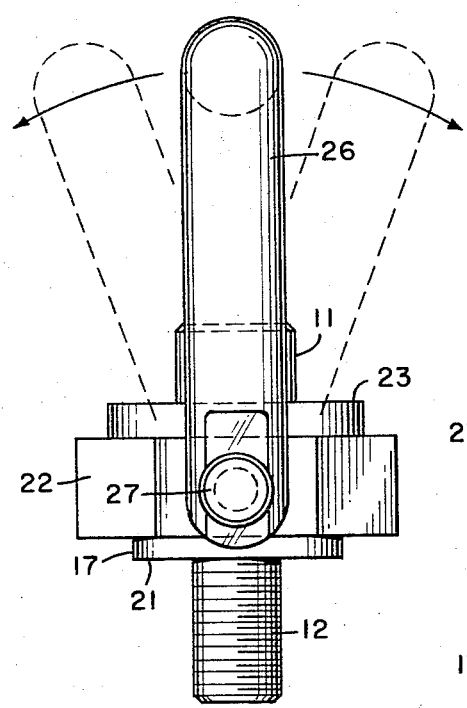
FIG. 2 is a side elevational view, the eye member being shown in broken lines to illustrate different positions.

It will be importantly noted that the eye member 26 can be pivoted about the pins 27 on a pivot axis transverse to the bushing axis for substantially 180 degrees. This swinging or pivoting movement of eye member 26 is suggested by the broken line positions illustrated in FIG. 2.

It is thought that the functional advantages of the fastening device have become apparent from the foregoing detailed description of parts, but for completeness of disclosure, the usage of this double acting swivel eye will be further described. It will be assumed that the component parts of the fastening device have been assembled.

Figure 4:
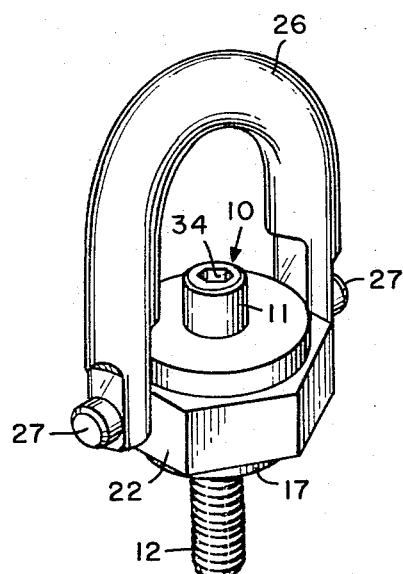
FIG. 4 is a perspective view.
Figure 3:
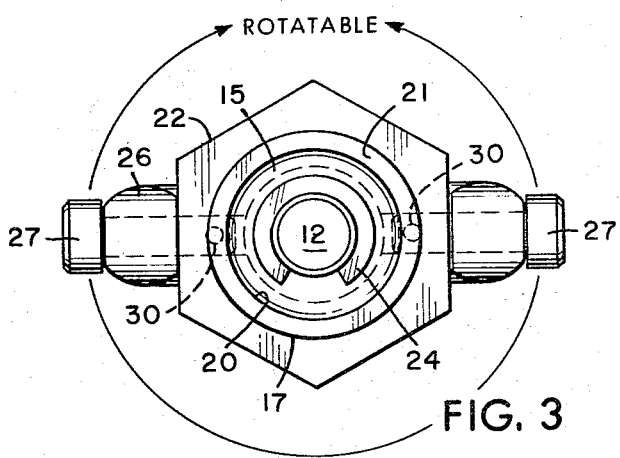
FIG. 3 is a bottom plan view.

First, the fastening device is secured to the base 13 in the desired location by affixing the stud 10 in any suitable manner. In the embodiment disclosed in FIG. 1, the stud 10 is turned by a tool (not shown) fitted into a socket 31 (FIG. 4) formed in the stud head 11, whereby to attach the stud shank 12 threadedly to the base 13. As the stud 10 is tightened, the bearing surface 21 is pressed against the base surface 14. When the fastening device is secured in place, a load can be attached by securing a rope or cable to the eye member 26 and drawing the connecting member taut. For most efficient use of the fastening device, the ring 22 is rotated on the bushing 15 so that the pivotal axis provided by pivot pins 27 is located at a right angle to a vertical plane passed through the connecting member. Moreover, the eye member 26 will pivot freely about the pivot pins 27 until it is aligned with such connecting member and aligned in the direction of force applied by such connecting member.

The stud 10 is the main tension and shear connection that transmits the vertical component of load in tension and transmits the horizontal component of load in shear to the base 13. The plate 23 transmits the vertical component of load in bearing from bushing 15 and ring 22 to the stud 10.

The horizontal component of load is transformed from bushing 15 to stud 10 in bearing and is transmitted in shear to the base 13. The moment induced by the eccentric application of the horizontal component of load on bushing 15 in relation to the base 13 is transformed by bushing 15 into a couple acting in tension on the stud 10 and acting in bearing in a controlled area between the bearing surface 21 and the base surface 14.

The ring 22 transmits the horizontal component of load in bearing to the bushing 15, and transmits the vertical component of load to the plate 23 in bearing and to the bushing flange 17 in friction. While performing the function of transmitting the horizontal and vertical components of load, the ring 22 can rotate freely on bushing 15 and the eye member 26 can rotate on the pivot pins 27 so that the eye member 26 assumes the load action line.

The pivot pins 27 transfer the horizontal and vertical components of load from the eye member 26 to the ring 22 in shear and act as the center of the 180 degree rotation of eye member 26.

Although the invention has been described by making detailed reference to a single preferred embodiment, such detail is to be understood in an instructive, rather than in any restrictive sense, many variants being possible within the scope of the claims hereunto appended.

We claim as our invention:

1. A fastening device for anchoring a load to a base comprising:
   (a) a stud adapted to be fastened to the base,
   (b) a bushing mounted about the stud, the bushing including a bearing surface located a predetermined distance from the axis of the bushing and engageable with the base, and
   (c) a load-attaching means operatively and pivotally connected to the bushing and stud for transferring a couple load in tension on the stud and in bearing to the base through the bearing surface.

2. A fastening device for anchoring a load to a base comprising:
   (a) a stud adapted to be fastened to the base,
   (b) a bushing mounted on and about the stud,
   (c) the bushing including a bearing surface located a predetermined distance from the axis of the bushing and engageable with the base,
   (d) a load-ring rotatively mounted on the bushing, the ring being operatively connected to the bushing and stud so that a moment induced by a eccentric application of the horizontal component of load on the bushing in relation to the base is transformed into a couple acting in tension on the stud and in bearing between the base and the bearing surface of the bushing.

3. A fastening device for anchoring a load to a base comprising:
   (a) a stud adapted to be fastened to the base,
   (b) a bushing mounted on and about the stud,
   (c) the bushing including a peripheral bearing surface of concentrated area located a predetermined distance from the axis of the bushing, the bearing surface being engageable with the base,
   (d) a load-ring rotatively mounted on the bushing, the ring being operatively connected to the bushing and stud so that a moment induced by an eccentric application of the horizontal component of load on the bushing in relation to the base is transformed into a couple acting in tension on the stud and in bearing between the base and the bearing surface of the bushing.

4. A fastening device for anchoring a load to a base comprising:
   (a) a stud adapted to be fastened to the base,
   (b) a bushing mounted on and about the stud,
   (c) the bushing including a peripheral flange, the bushing being recessed to provide a peripheral bearing surface of concentrated area on the flange a predetermined distance from the axis of the bushing, the bearing surface being engageable with the base,
   (d) a load-ring rotatively mounted on the bushing and seating on the flange, and
   (e) means for connecting a load to the ring,
   (f) the moment induced by an eccentric application of the horizontal component of load on the bushing in relation to the base being transformed into a couple acting in tension on the stud and in bearing between the base and the bearing surface of the bushing.

5. A fastening device for anchoring a load to a base comprising:
   (a) a stud adapted to be fastened to the base,
   (b) a bushing mounted on and about the stud,
   (c) the bushing including a peripheral flange, the bushing being recessed to provide a peripheral bearing surface of concentrated area on the flange a predetermined distance from the axis of the bushing, the bearing surface being engageable with the base,
   (d) a load-ring rotatively mounted on the bushing and seating on the flange,
   (e) means for connecting a load to the ring,
   (f) the moment induced by an eccentric application of the horizontal component of load on the bushing in relation to the base being transformed into a couple acting in tension on the stud and in bearing between the base and the bearing surface of the bushing, and
   (g) means mounted on the stud and located operatively between the stud on one side and the ring and bushing on the other side so as to retain the ring and bushing and so as to transmit the vertical component of load from the ring and bushing to the stud.

6. A fastening device for anchoring a load to a base comprising:
   (a) a stud adapted to be fastened to the base, the stud having a head and a shank,
   (b) a bushing mounted on and about the shank,
   (c) the bushing including a peripheral flange, the bushing being recessed to provide a peripheral bearing surface of concentrated area on the flange a predetermined distance from the axis of the bushing, the bearing surface being engageable with the base,
   (d) a load-ring rotatively mounted on the bushing and seating on the flange,
   (e) means for connecting a load to the ring, and
   (f) a plate mounted on the shank and located between the stud head on one side and the ring and bushing on the other side so as to retain the ring and bushing and so as to transmit the vertical component of load from the ring and bushing to the stud,
  (g) the moment induced by an eccentric application of the horizontal component of load on the bushing in relation to the base being transformed into a couple acting in tension on the stud and in bearing between the base and the bearing surface of the bushing.

7. A fastening device for anchoring a load to a base comprising:
  (a) a stud adapted to be fastened to the base,
  (b) a bushing mounted on and about the stud,
  (c) the bushing including a bearing surface located a predetermined distance from the axis of the bushing and engageable with the base,
  (d) a load-ring rotatively mounted on the bushing,
  (e) means for connecting a load to the ring, and
  (f) means operatively interconnecting the stud to the ring and bushing so as to transmit the vertical component of load from the ring and bushing to the stud.

8. A fastening device for anchoring a load to a base comprising:
  (a) a stud adapted to be fastened to the base, the stud including a head and a shank,
  (b) a bushing mounted on and about the shank,
  (c) the bushing including a bearing surface engageable with the base,
  (d) a load-ring mounted on the bushing,
  (e) means for connecting a load to the ring, and
  (f) a plate mounted on the shank between the stud head on one side and the ring and bushing on the other side so as to retain the ring and bushing and so as to transmit the vertical component of load from the ring and bushing to the stud.

9. A fastening device for anchoring a load to a base comprising:
  (a) a stud adapted to be fastened to the base,
  (b) a bushing mounted on and about the stud,
  (c) the bushing including a peripheral bearing surface of concentrated area located a predetermined distance from the axis of the bushing, the bearing surface being engageable with the base,
  (d) a load-ring rotatively mounted on the bushing for a full 360 degree swivel about the axis of the bushing, and
  (e) an eye member pivotally connected to the ring on an axis transverse to the bushing axis and swingable for substantially 180 degrees, the eye member being connectable to a load.

10. A double acting swivel eye for anchoring a load to a base comprising:
  (a) a stud having a head and a shank adapted to be fastened to the base,
  (b) a bushing mounted on and about the stud,
  (c) the bushing including a peripheral flange, the bushing being recessed to provide a peripheral bearing surface of concentrated area on the flange a predetermined distance from the axis of the bushing and engageable with the base,
  (d) a load-ring rotatively mounted on the bushing and seating on the flange for a full 360 degree swivel about the axis of the bushing,
  (e) an eye member pivotally connected to the ring on an axis transverse to the bushing axis and swingable for substantially 180 degrees, the eye member being connectable to a load, and
  (f) a plate mounted on the shank and located operatively between the stud head on one side and the ring and bushing on the other side so as to retain the ring and bushing and so as to transmit the vertical component of load from the ring and bushing to the stud,
  (g) the moment induced by an eccentric application of the horizontal component of load on the bushing in relation to the base being transformed into a couple acting in tension on the stud and in bearing between the base and the bushing surface.

11. A bushing comprising:
  (a) a body having a bore along its axis,
  (b) a peripheral annular flange at one end,
  (c) a recess in said one end extending laterally outward from the body axis and into the flange to provide an annular bearing surface of concentrated area located a predetermined distance from the axis of the body, and
  (d) the body having an external, annular slidable bearing surface above the flange and formed about an axis parallel to the body axis.

References Cited by the Examiner

UNITED STATES PATENTS

| | | | |
|---|---|---|---|
| 649,270 | 5/1900 | Collins | 248—59 |
| 692,841 | 2/1902 | Fenton | 40—145 |

CLAUDE A. LE ROY, *Primary Examiner.*

J. F. FOSS, *Assistant Examiner.*